US012772287B2

(12) United States Patent
Liu et al.

(10) Patent No.: US 12,772,287 B2
(45) Date of Patent: Oct. 20, 2026

(54) POWER CONFIGURATION FOR CHANNEL OCCUPANCY TIME SIGNALING

(71) Applicant: QUALCOMM Incorporated, San Diego, CA (US)

(72) Inventors: Chih-Hao Liu, San Diego, CA (US); Jing Sun, San Diego, CA (US); Jae Ho Ryu, San Diego, CA (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/414,221

(22) Filed: Jan. 16, 2024

(65) Prior Publication Data

US 2024/0381423 A1 Nov. 14, 2024

Related U.S. Application Data

(60) Provisional application No. 63/501,987, filed on May 12, 2023.

(51) Int. Cl.
*H04W 74/0816* (2024.01)
*H04W 52/36* (2009.01)
(Continued)

(52) U.S. Cl.
CPC ..... *H04W 74/0816* (2013.01); *H04W 52/367* (2013.01); *H04W 74/0891* (2013.01); *H04W 92/18* (2013.01)

(58) Field of Classification Search
CPC ........... H04W 74/0816; H04W 52/367; H04W 74/0891; H04W 92/18
(Continued)

(56) References Cited

U.S. PATENT DOCUMENTS

2020/0128588 A1* 4/2020 Xiong ............... H04W 74/0833
2021/0410084 A1* 12/2021 Li ....................... H04W 52/265
(Continued)

FOREIGN PATENT DOCUMENTS

WO 2022198559 A1 9/2022

OTHER PUBLICATIONS

Apple: "On Sidelink Physical Channel Design Framework for Unlicensed Spectrum", 3GPP TSG RAN WG1 #112bis-e, R1-2303485, 3rd Generation Partnership Project, Mobile Competence Centre, 650, Route Des Lucioles, F-06921 Sophia-Antipolis Cedex, France, vol. RAN WG1, No. e-Meeting, Apr. 14, 2023-Apr. 26, 2023, Apr. 7, 2023, 26 Pages, XP052352945, the whole document.
(Continued)

*Primary Examiner* — Mark G. Pannell
(74) *Attorney, Agent, or Firm* — Harrity & Harrity, LLP

(57) ABSTRACT

Various aspects of the present disclosure generally relate to wireless communication. In some aspects, a user equipment (UE) may initiate a wideband channel occupancy time (COT) associated with a plurality of resource block (RB) sets. The UE may transmit a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter. Numerous other aspects are described.

17 Claims, 10 Drawing Sheets

(51) Int. Cl.
*H04W 74/08* (2009.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2022/0210747 | A1 | 6/2022 | Lee et al. | |
| 2024/0276547 | A1* | 8/2024 | Hoang | H04L 1/1896 |
| 2025/0056434 | A1* | 2/2025 | Li | H04W 72/0453 |
| 2025/0220605 | A1* | 7/2025 | Hwang | H04W 56/0015 |
| 2025/0301430 | A1* | 9/2025 | Lee | H04L 5/005 |

OTHER PUBLICATIONS

International Search Report and Written Opinion—PCT/US2024/027027—ISA/EPO—Jul. 5, 2024.

Kim Y (Samsung)., et al., "On Physical Channel Design Framework for Sidelink on FR1 Unlicensed Spectrum", 3GPP TSG RAN WG1 #112bis-e, R1-2303130, Type Discussion, NR_SL_ENH2-CORE, 3rd Generation Partnership Project, Mobile Competence Centre, 650, Route Des Lucioles, F-06921 Sophia-Antipolis Cedex, France, vol. 3GPP RAN 1, No. Online, Apr. 17, 2023-Apr. 26, 2023, Apr. 7, 2023, 11 Pages, XP052293697, the whole document.

* cited by examiner

POWER CONFIGURATION FOR CHANNEL OCCUPANCY TIME SIGNALING

CROSS-REFERENCE TO RELATED APPLICATION

This Patent Application claims priority to U.S. Provisional Patent Application No. 63/501,987, filed on May 12, 2023, entitled "POWER CONFIGURATION FOR CHANNEL OCCUPANCY TIME SIGNALING," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for power configuration for channel occupancy time signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include initiating a wideband channel occupancy time (COT) associated with a plurality of resource block (RB) sets. The method may include transmitting a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

Some aspects described herein relate to a UE for wireless communication. The UE may include one or more memories and one or more processors coupled to the one or more memories. The one or more processors may be configured to initiate a wideband COT associated with a plurality of RB sets. The one or more processors may be configured to transmit a plurality S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

Some aspects described herein relate to a non-transitory computer-readable medium that stores a set of instructions for wireless communication by a UE. The set of instructions, when executed by one or more processors of the UE, may cause the UE to initiate a wideband COT associated with a plurality of RB sets. The set of instructions, when executed by one or more processors of the UE, may cause the UE to transmit a plurality of sidelink S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

Some aspects described herein relate to an apparatus for wireless communication. The apparatus may include means for initiating a wideband COT associated with a plurality of RB sets. The apparatus may include means for transmitting a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

Some aspects described herein relate to an apparatus for wireless communication. The apparatus may include means for initiating a wideband COT associated with a plurality of RB sets; and means for transmitting a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter. In some aspects, the quantity of S-SSB repetitions is based at least in part on a maximum transmit power of the apparatus. In some aspects, the means for transmitting the plurality of S-SSB repetitions in the at least the portion of the plurality of RB sets comprises: means for transmitting the plurality of S-SSB repetitions in a quantity of RB sets that is less than a quantity configured RB sets in the plurality of RB sets. In some aspects, the transmit power of at least one S-SSB repetition, of the plurality of S-SSB repetitions, in an anchor RB set of the plurality of RB sets is offset from a maximum transmit power by a threshold amount. In some aspects, the transmit power of a subset of at least one S-SSB repetition, of the plurality of S-SSB repetitions, in a non-anchor RB set of the plurality of RB sets is offset from a maximum transmit power by a threshold amount. In some aspects, the at least one S-SSB repetition in the non-anchor RB set is a wideband COT padding communication. In some aspects, the offset from the maximum transmit power is associated with an anchor RB set transmit power.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
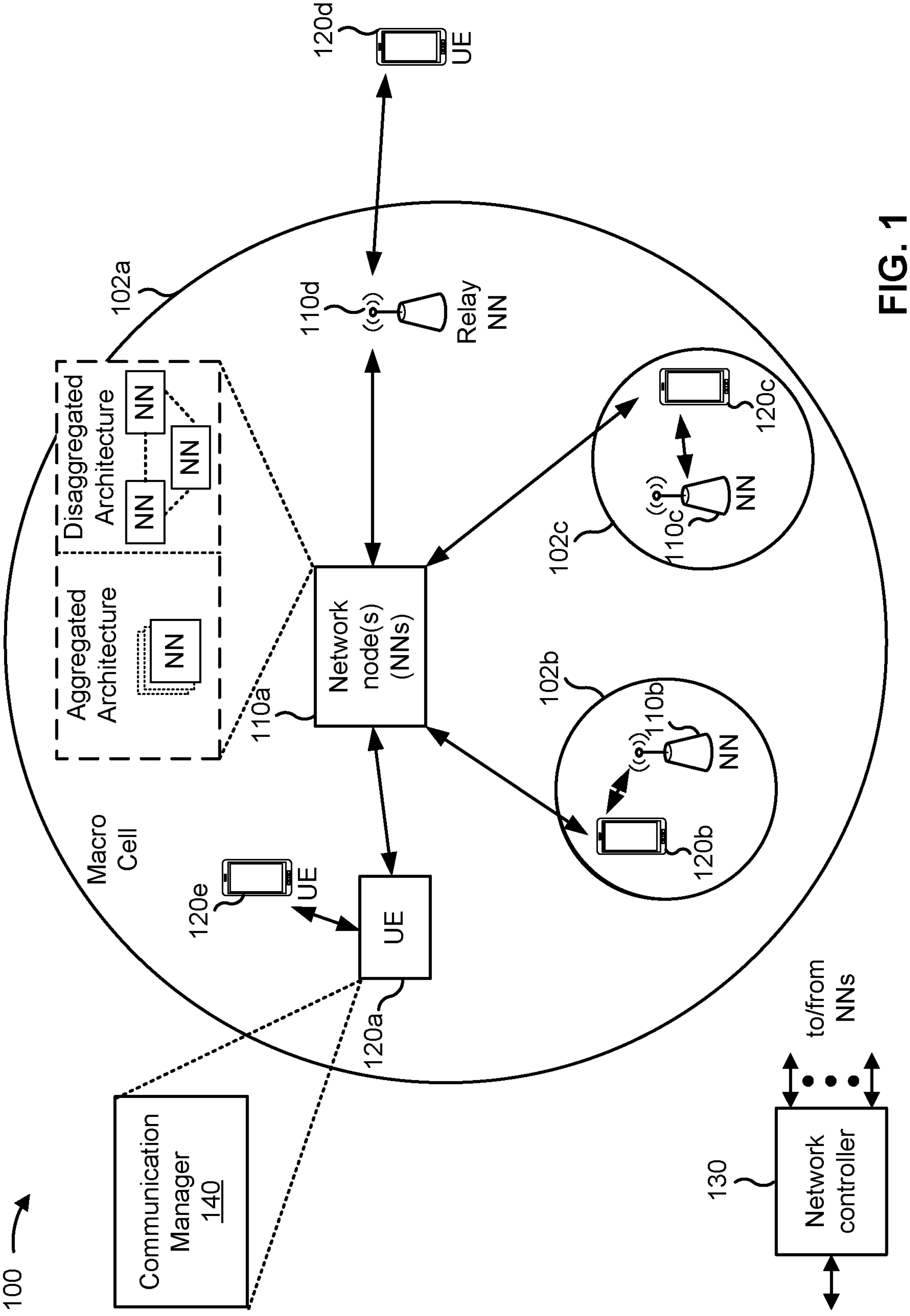
FIG. 1 is a diagram illustrating an example of a wireless network, in accordance with the present disclosure.

To accommodate increasing traffic demands, there have been various efforts to improve spectral efficiency in wireless networks and thereby increase network capacity (e.g., via use of higher order modulations, advanced multiple-input, multiple-output (MIMO) antenna technologies, and/or multi-cell coordination techniques, among other examples). Another way to potentially improve network capacity is to expand system bandwidth. However, available spectrum in lower frequency bands that have traditionally been licensed or otherwise allocated to mobile network operators has become very scarce. Accordingly, various technologies have been developed to enable operation of a cellular radio access technology (RAT) in unlicensed or other shared spectrum.

In general, when operating a cellular RAT in unlicensed spectrum, one challenge that arises is the need to ensure fair coexistence with incumbent systems that may be operating in the unlicensed spectrum. For example, prior to gaining access to and/or transmitting over an unlicensed channel, a user equipment (UE) that has a packet to transmit may need to perform a listen-before-talk (LBT) procedure to contend for access to the unlicensed channel. The LBT procedure may include detecting an energy level on the unlicensed channel and determining whether the energy level satisfies (e.g., is less than or equal to) a threshold, sometimes referred to as an energy detection threshold and/or the like. When the energy level satisfies (e.g., does not equal or exceed) the threshold, the UE may gain access to the unlicensed channel for a duration that may be referred to as a channel occupancy time (COT) during which the UE can transmit without performing additional LBT operations.

When communicating on a sidelink in, for example, unlicensed spectrum, a transmit (Tx) UE may transmit a sidelink synchronization signal block (S-SSB) transmission to convey configuration information to a receive (Rx) UE. The Tx UE may repeat the S-SSB across a plurality of resource block (RB) sets, such as on an anchor RB set and a non-anchor RB set to maintain a wideband COT across a set of S-SSB candidate slots. In this case, the Tx UE repeats the S-SSB waveform in all candidate S-SSB slots within a COT after clearing an LBT procedure. A wideband COT may include a COT that is associated with a band larger than one resource block (RB) set. For example, wideband operation may include operation in a channel larger than 20 megahertz (MHz). In some examples, wideband operation may include operation in a channel in which intra-cell guard bands can be configured to distinguish individual RB sets.

When the Tx UE is to resume a wideband COT after the set of S-SSB candidate slots, the Tx UE may repeat transmission of the S-SSB (as a wideband COT padding signal) in one or more RB sets for which the UE is to resume the wideband COT. However, when the UE transmits a plurality of S-SSB repetitions (e.g., instances of the S-SSB waveform) in a plurality of RB sets that the wideband COT is occupying, a received transmission power at the Rx UE may exceed one or more transmit power thresholds when transmitting at a maximum power across the plurality of RB sets.

Various aspects relate generally to power control for COT signaling. Some aspects more specifically relate to initiating a wideband COT and transmitting a plurality of S-SSB repetitions, such that a transmit power criterion is not exceeded. In some examples, a UE may limit a quantity of S-SSB repetitions in different RB sets based at least in part on a maximum transmit power of the UE. Additionally, or alternatively, the UE may use a transmit power, that is less than the maximum transmit power of the UE, for transmission of one or more S-SSB repetitions in an anchor RB set. Additionally, or alternatively, the UE may use a transmit power, that is less than a maximum transmit power of the UE, for transmission of one or more S-SSB repetitions in a non-anchor set.

Particular aspects of the subject matter described in this disclosure can be implemented to realize one or more of the following potential advantages. In some examples, by limiting a quantity of S-SSB repetitions or a transmit power of one or more of the S-SSB repetitions, the described techniques can be used to avoid power fluctuation issues at an Rx UE, which may result in interference, failure to successfully decode a transmission, or dropped communications, among other examples. Additionally, or alternatively, by allocating transmit power to different S-SSB repetitions such that a maximum transmit power is not exceeded, the described techniques can be used to avoid interference, failure to successfully decode a transmission, or dropped communications, among other examples. Additionally, by determining a power configuration for the S-SSB repetitions, the Tx UE can avoid power fluctuation issues at the Rx UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may initiate a wideband channel occupancy time (COT) associated with a plurality of resource block (RB) sets; and transmit a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter. Additionally, or alternatively, the communication manager 140 may perform one or more other operations described herein.

As indicated above, FIG. 1 is provided as an example. Other examples may differ from what is described with regard to FIG. 1.

Figure 2:
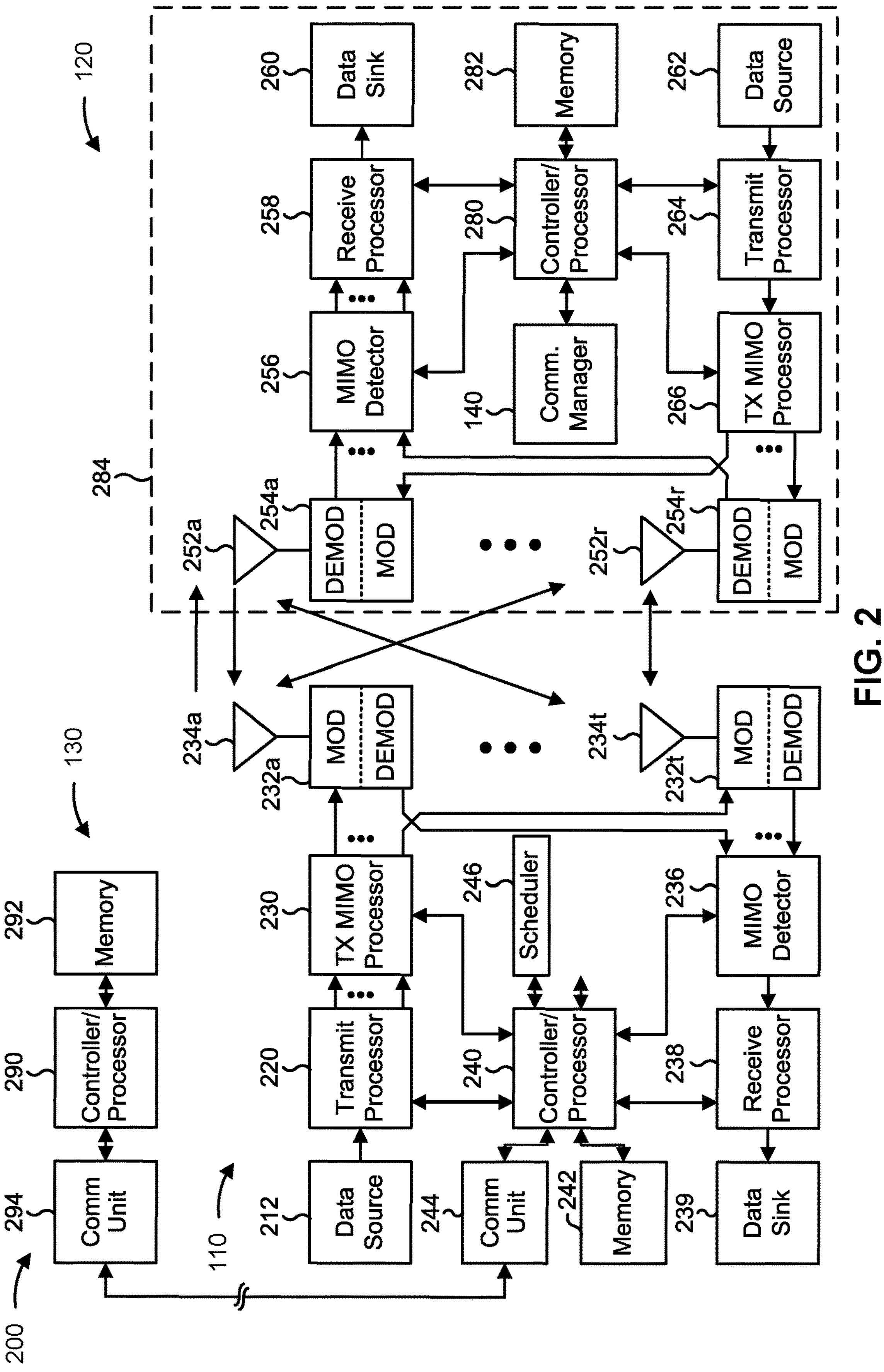
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-10).

The controller/processor 240 of the network node 110, the controller/processor 280 of the UE 120, and/or any other component(s) of FIG. 2 may perform one or more techniques associated with power configuration for COT signaling, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, the UE 120 includes means for initiating a wideband COT associated with a plurality of RB sets; and/or means for transmitting a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
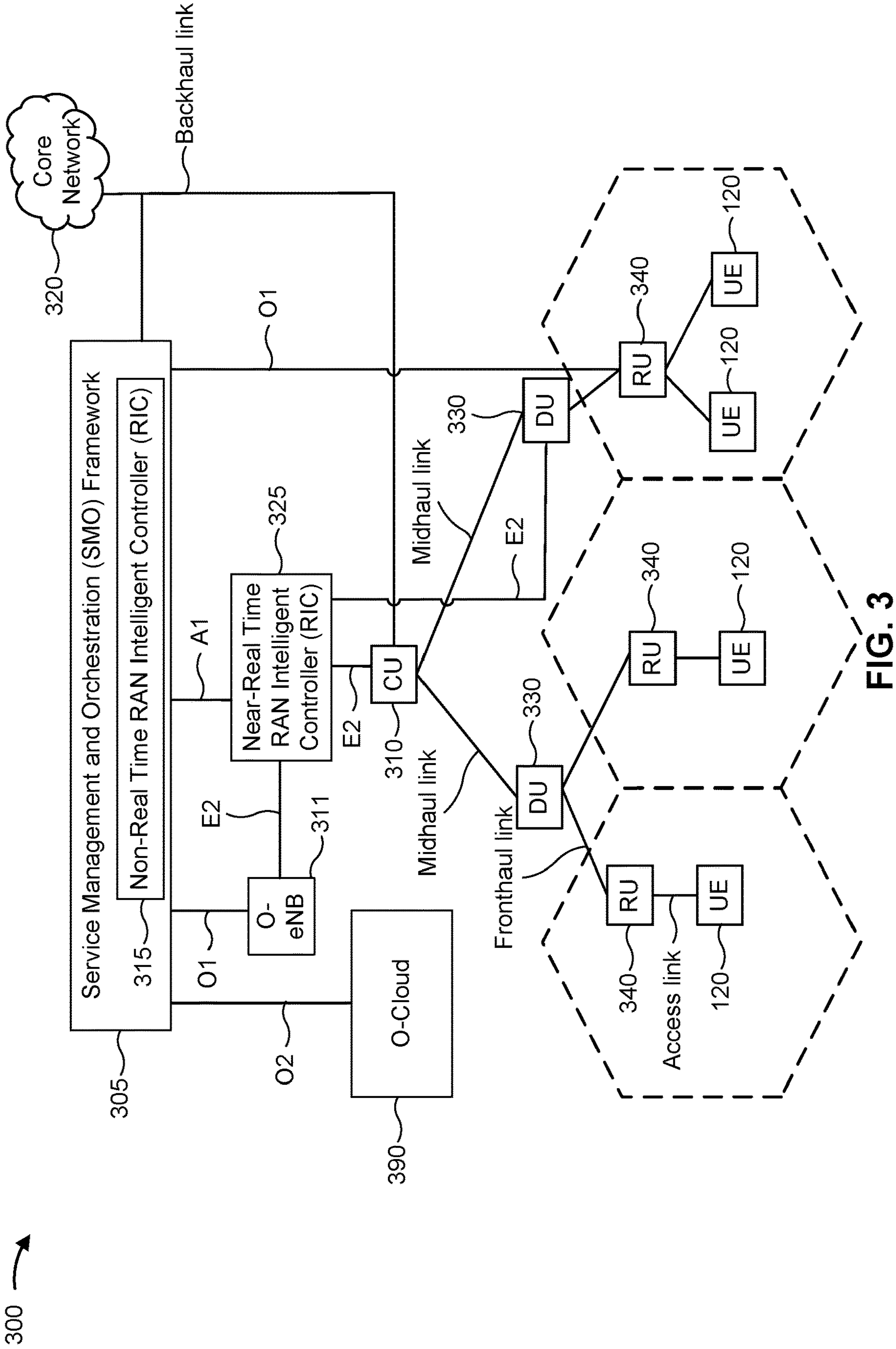
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
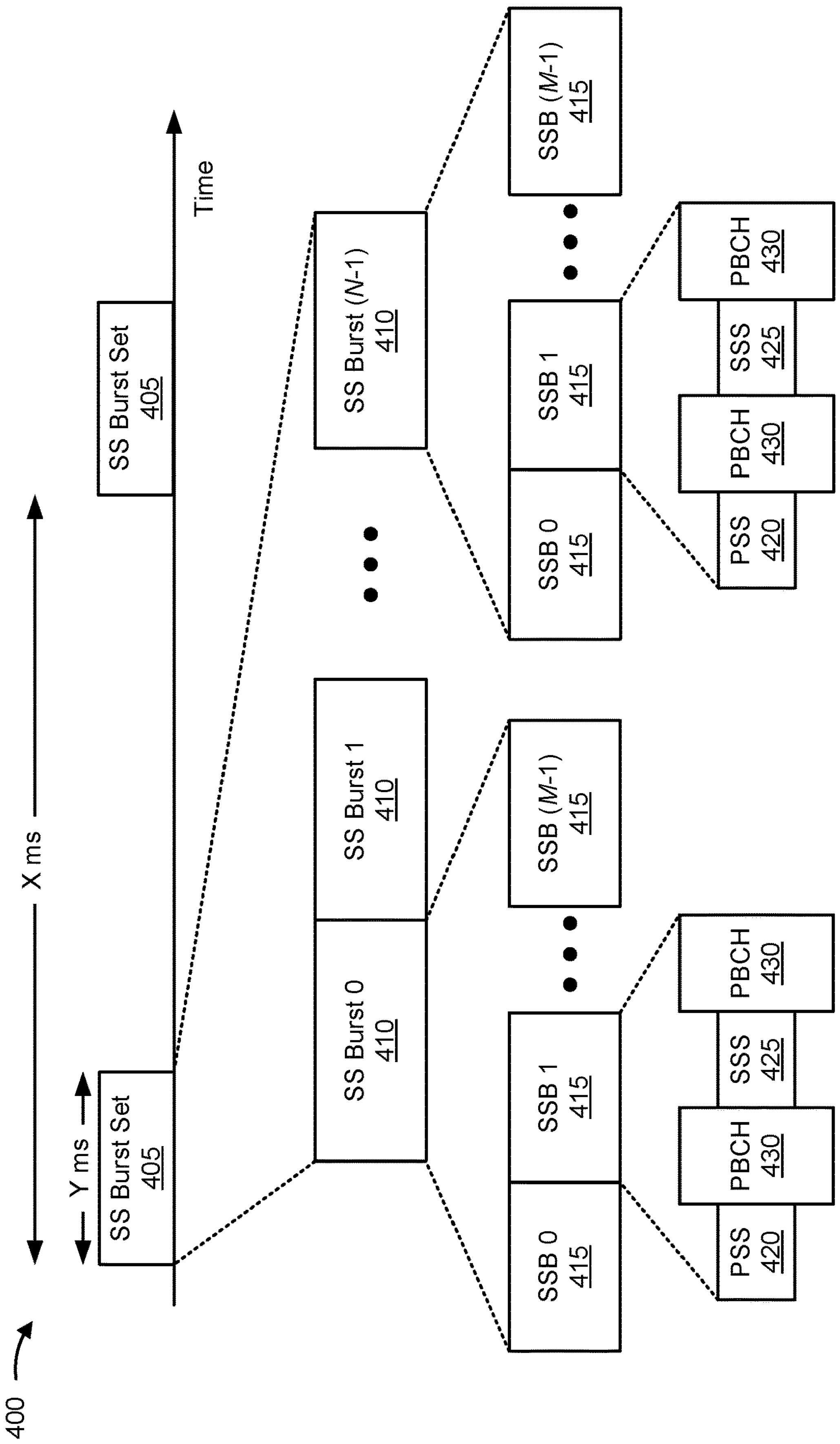
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SS blocks (SSBs) 415, shown as SSB 0 through SSB M−1, where M is a maximum number of SSBs 415 that can be carried by an SS burst 410. In some examples, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some examples, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some examples, an SSB 415 may include resources that carry a primary synchronization signal (PSS) 420, a secondary synchronization signal (SSS) 425, and/or a physical broadcast channel (PBCH) 430. In some examples, multiple SSBs 415 are included in an SS burst 410 (e.g., with transmission on different beams), and the PSS 420, the SSS 425, and/or the PBCH 430 may be the same across each SSB 415 of the SS burst 410. In some examples, a single SSB 415 may be included in an SS burst 410. In some examples, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some examples, an SSB 415 may be referred to as an SS/PBCH block.

In some examples, the symbols of an SSB 415 are consecutive, as shown in FIG. 4. In some examples, the symbols of an SSB 415 are non-consecutive. Similarly, in some examples, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some examples, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some examples, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some examples, an SSB 415 may include an SSB index, which may correspond to a beam used to carry the SSB 415. An Rx UE may monitor for and/or measure SSBs 415 using different receive (Rx) beams during an access procedure, among other examples. Based at least in part on the monitoring and/or measuring, the Rx UE may indicate one or more SSBs 415 with a best signal parameter (e.g., a reference signal received power (RSRP) parameter) to a Tx UE. The Rx UE and the Tx UE may use the one or more indicated SSBs 415 to select one or more beams to be used for communication. Additionally, or alternatively, a UE may use the SSB 415 and/or the SSB index to determine a cell timing for resources via which the SSB 415 is received.

As indicated above, FIG. 4 is provided as an example. Other examples may differ from what is described with regard to FIG. 4.

Figure 5:
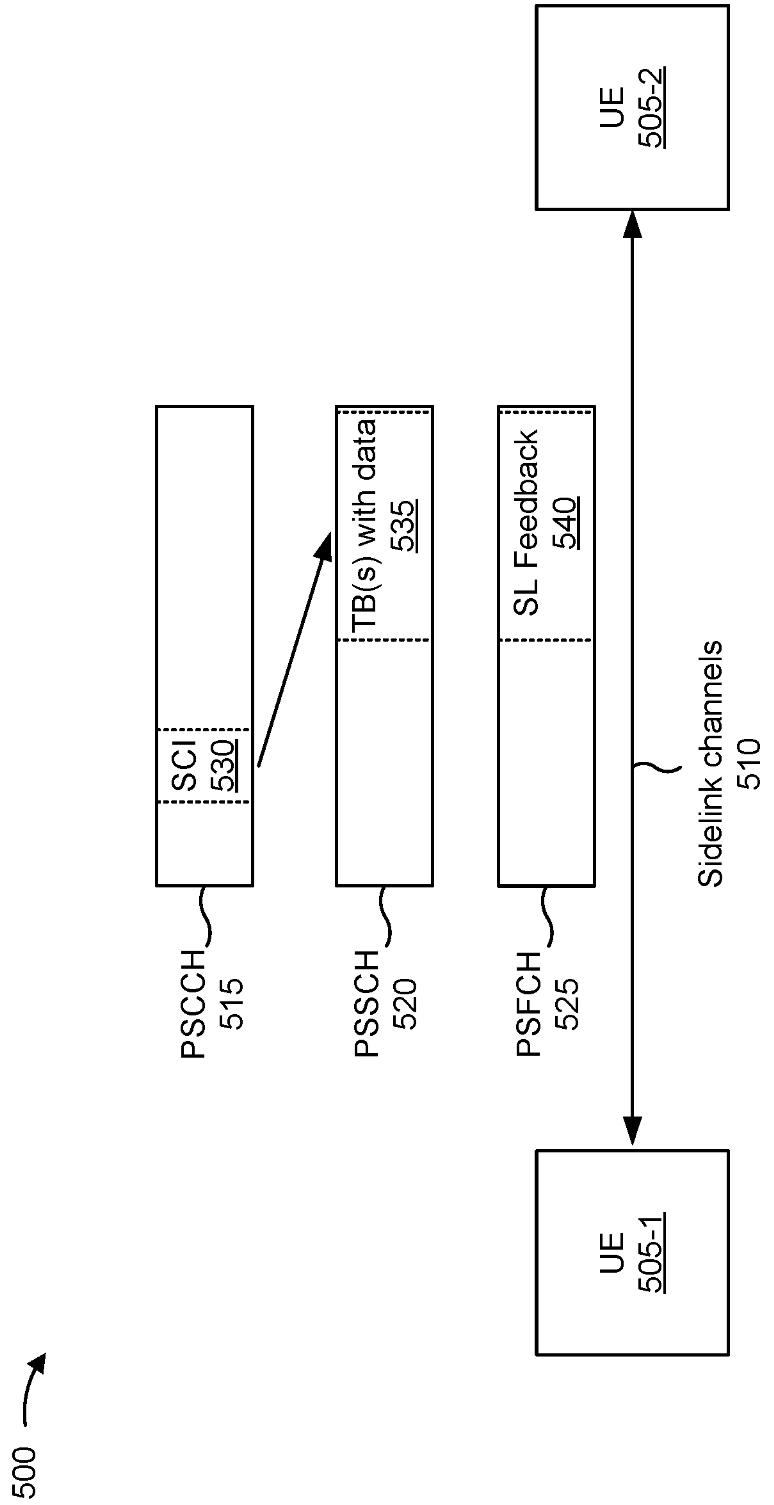
FIG. 5 is a diagram illustrating an example of sidelink communications, in accordance with the present disclosure.

FIG. 5 is a diagram illustrating an example 500 of sidelink communications, in accordance with the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, and/or V2P communications) and/or mesh networking. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, or symbols) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with a network node 110 via an access link or an access channel. The PSSCH 520 may be used to communicate data, similar to a physical downlink shared channel (PDSCH) and/or a physical uplink shared channel (PUSCH) used for cellular communications with a network node 110 via an access link or an access channel. For example, the PSCCH 515 may carry sidelink control information (SCI) 530, which may indicate various control information used for sidelink communications, such as one or more resources (e.g., time resources, frequency resources, and/or spatial resources) where a transport block (TB) 535 may be carried on the PSSCH 520. The TB 535 may include data. The PSFCH 525 may be used to communicate sidelink feedback 540, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 515, in some aspects, the SCI 530 may include multiple communications in different stages, such as a first stage SCI (SCI-1) and a second stage SCI (SCI-2). The SCI-1 may be transmitted on the PSCCH 515. The SCI-2 may be transmitted on the PSSCH 520. The SCI-1 may include, for example, an indication of one or more resources (e.g., time resources, frequency resources, and/or spatial resources) on the PSSCH 520, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 520, such as a hybrid automatic repeat request (HARQ) process ID, a new data indicator (NDI), a source identifier, a destination identifier, and/or a channel state information (CSI) report trigger.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a sidelink transmission mode (e.g., Mode 1) where resource selection and/or scheduling is performed by a network node 110 (e.g., a base station, a CU, or a DU). For example, the UE 505 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 505 may operate using a transmission mode (e.g., Mode 2) where resource selection and/or scheduling is performed by the UE 505 (e.g., rather than a network node 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources and/or channel parameters. Additionally, or alternatively, the UE 505 may perform resource selection and/or scheduling by determining a channel busy ratio (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, and/or a modulation and coding scheme (MCS) to be used for the upcoming sidelink transmission. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
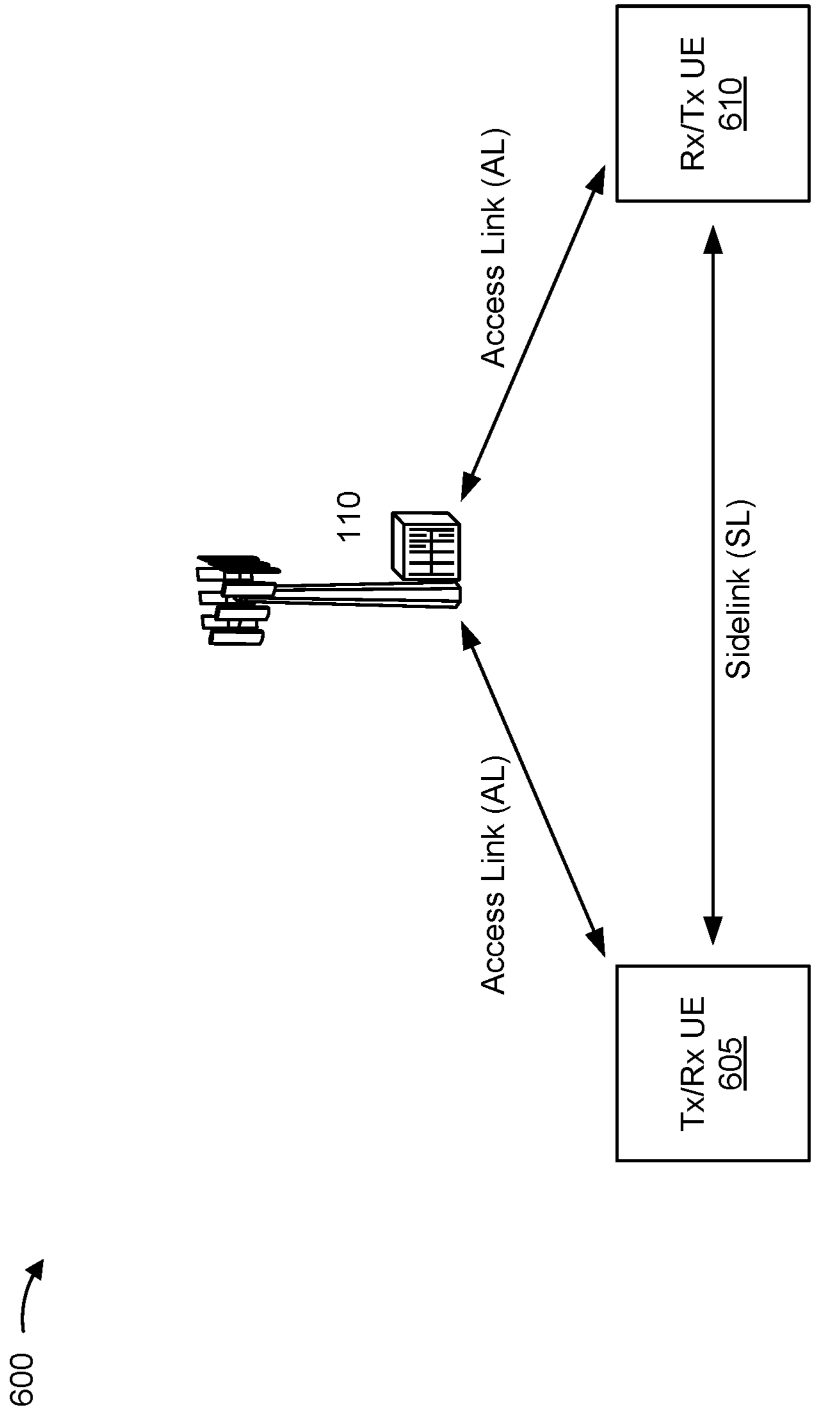
FIG. 6 is a diagram illustrating an example of sidelink communications and access link communications, in accordance with the present disclosure.

FIG. 6 is a diagram illustrating an example 600 of sidelink communications and access link communications, in accordance with the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a network node 110 may communicate with the Tx/Rx UE 605 (e.g., directly or via one or more network nodes), such as via a first access link. Additionally, or alternatively, in some sidelink modes, the network node 110 may communicate with the Rx/Tx UE 610 (e.g., directly or via one or more network nodes), such as via a first access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 6 is provided as an example. Other examples may differ from what is described with respect to FIG. 6.

Figure 7:
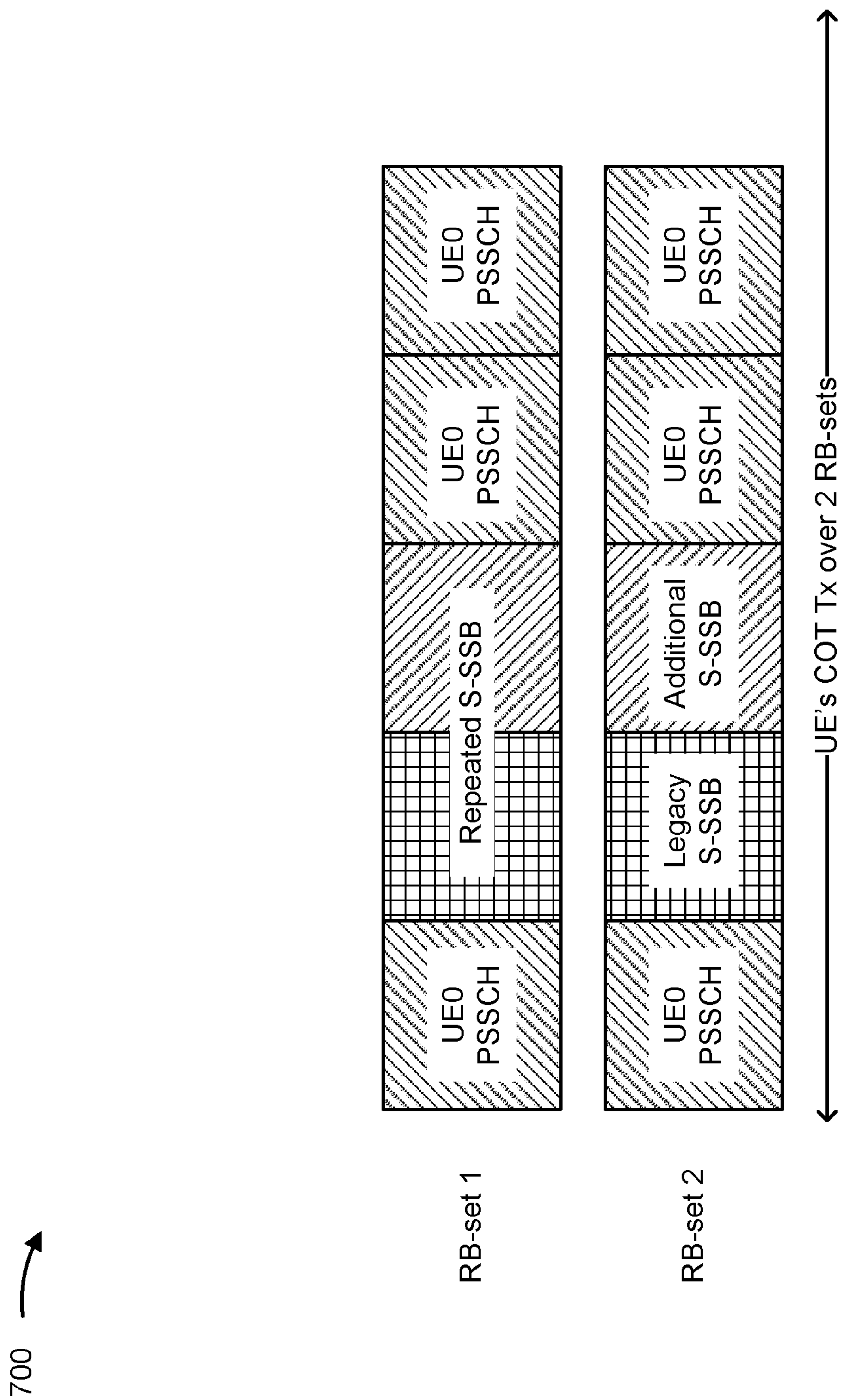
FIG. 7 is a diagram illustrating an example of wideband channel occupancy time (COT) padding signals, in accordance with the present disclosure.

FIG. 7 is a diagram illustrating an example 700 of wideband channel occupancy time (COT) padding signals, in accordance with the present disclosure.

As shown in FIG. 7, a Tx UE may occupy a COT over a plurality of RB sets, such as a first RB set (RB-set 0) and a second RB set (RB-set 1). The Tx UE may transmit one or more communications using the COT, such as a set of PSSCH communications and/or an S-SSB communication. The S-SSB communication may include a first S-SSB communication for a first type of Rx UE (e.g., a legacy S-SSB for legacy Rx UEs) and a second S-SSB communication for a second type of Rx UE (e.g., an additional S-SSB for Rx UEs with additional agreed functionalities, such as carrier-specific functionalities or next generation/release functionalities). The Tx UE may repeat transmission across the plurality of RB sets. For example, the UE may transmit the legacy S-SSB in RB-set 0 and RB-set 1.

As indicated above, FIG. 7 is provided as an example. Other examples may differ from what is described with respect to FIG. 7.

One example of use of COTs is in unlicensed spectrum. In unlicensed spectrum, prior to gaining access to and/or transmitting over an unlicensed channel, a UE that has a packet to transmit may need to perform a listen-before-talk (LBT) procedure to contend for access to the unlicensed channel. The LBT procedure may include detecting an energy level on the unlicensed channel and determining whether the energy level satisfies (e.g., is less than or equal to) a threshold, sometimes referred to as an energy detection threshold and/or the like. When the energy level satisfies (e.g., does not equal or exceed) the threshold, the UE may gain access to the unlicensed channel for a duration that may be referred to as a COT during which the UE can transmit without performing additional LBT operations.

When communicating on a sidelink in, for example, unlicensed spectrum, a Tx UE may transmit an S-SSB transmission to convey configuration information to a Rx UE. The Tx UE may repeat the S-SSB across a plurality of resource block (RB) sets, such as on an anchor RB set and a non-anchor RB set to maintain a wideband COT across a set of S-SSB candidate slots. In this case, the Tx UE repeats the S-SSB waveform in all candidate S-SSB slots within a COT after clearing an LBT procedure. When the Tx UE is to resume a wideband COT after the set of S-SSB candidate slots, the Tx UE may repeat transmission of the S-SSB (as a wideband COT padding signal) in one or more RB sets for which the UE is to resume the wideband COT. However, when the UE transmits a plurality of S-SSB repetitions (e.g., instances of the S-SSB waveform) in a plurality of RB sets that the wideband COT is occupying, a received transmission power at the Rx UE may exceed one or more transmit power thresholds when transmitting at a maximum power across the plurality of RB sets.

Various aspects relate generally to power control for COT signaling. Some aspects more specifically relate to initiating a wideband COT and transmitting a plurality of S-SSB repetitions, such that a transmit power criterion is not exceeded. In some examples, a UE may limit a quantity of S-SSB repetitions in different RB sets based at least in part on a maximum transmit power of the UE. Additionally, or alternatively, the UE may use a transmit power, that is less than the maximum transmit power of the UE, for transmission of one or more S-SSB repetitions in an anchor RB set. Additionally, or alternatively, the UE may use a transmit power, that is less than a maximum transmit power of the UE, for transmission of one or more S-SSB repetitions in a non-anchor set.

Particular aspects of the subject matter described in this disclosure can be implemented to realize one or more of the following potential advantages. In some examples, by limiting a quantity of S-SSB repetitions or a transmit power of one or more of the S-SSB repetitions, the described techniques can be used to avoid power fluctuation issues at an Rx UE (e.g., physical sidelink broadcast channel (PSBCH) reference signal received power (RSRP) fluctuation), which may result in interference, failure to successfully decode a transmission, or dropped communications, among other examples.

Figure 8:
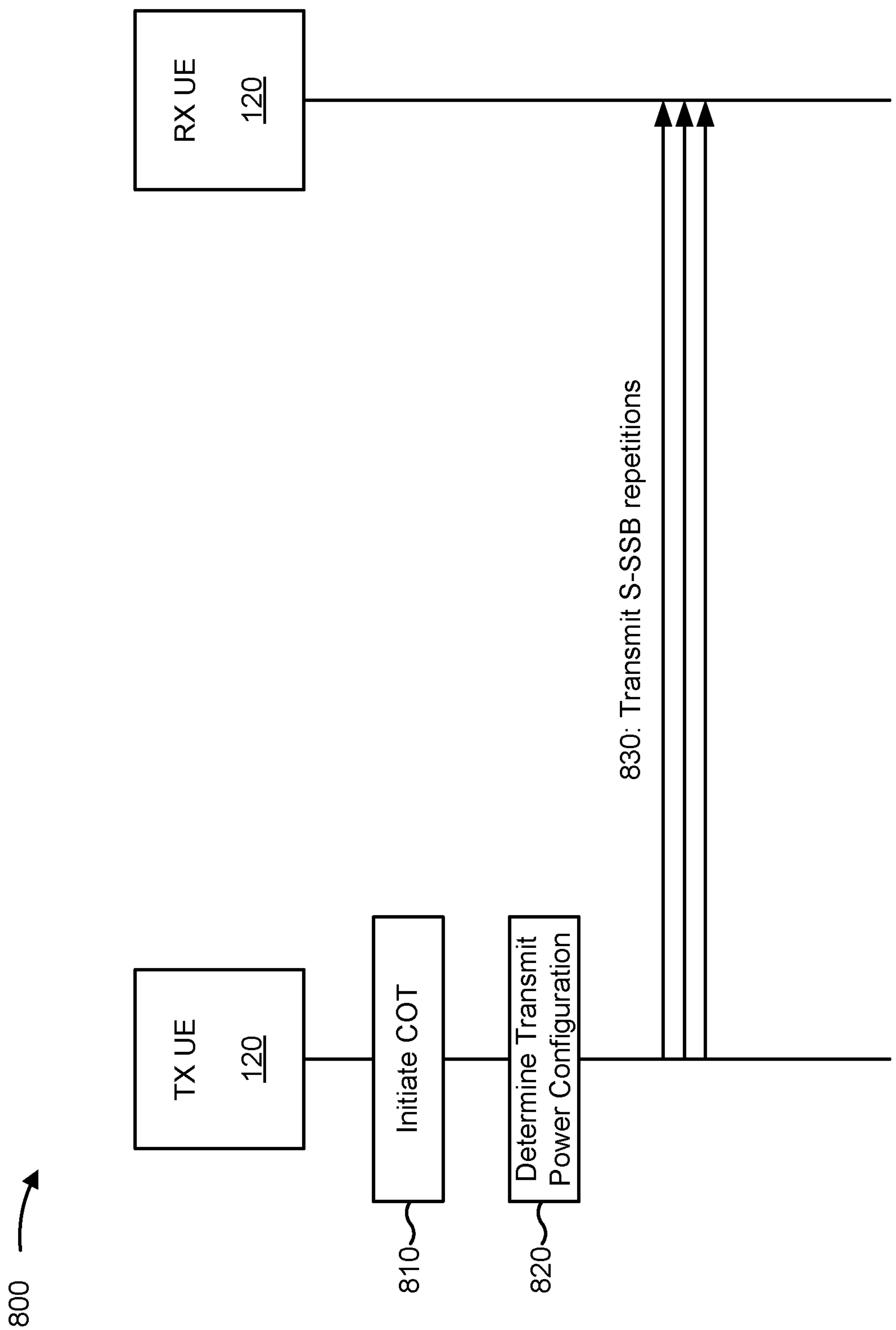
FIG. 8 is a diagram illustrating an example associated with power configuration for COT signaling, in accordance with the present disclosure.

FIG. 8 is a diagram illustrating an example 800 associated with power configuration for COT signaling, in accordance with the present disclosure. As shown in FIG. 8, example 800 includes communication between a Tx UE 120 and an Rx UE 120.

As further shown in FIG. 8, and by reference number 810, the Tx UE 120 may initiate a COT. For example, the Tx UE 120 may perform an LBT procedure to obtain access to a set of resources of one or more channels. In some aspects, the Tx UE 120 may establish a set of anchor RB sets and a set of non-anchor RB sets. For example, in connection with obtaining access to channel resources, the Tx UE 120 may determine that a first RB set is an anchor RB set and that one or more second RB sets are non-anchor RB sets. In this case, the Tx UE 120 may determine that control signaling and initial setup of communication services (e.g., between the Tx UE 120 and one or more possible Rx UEs 120) are to occur on a first RB set (e.g., which is assigned as the anchor RB set) and that data communications or backup signaling (e.g., repetitions for increased reliability) are to occur on a second RB set (e.g., which is assigned as the non-anchor RB set).

As further shown in FIG. 8, and by reference number 820, the Tx UE 120 may determine a transmit power configuration. For example, the Tx UE 120 may determine a transmit power configuration for transmitting repetitions of an S-SSB communication. In this case, repetitions of the S-SSB communication may refer to each instance of transmission of the S-SSB communication. Thus, a first (original) transmission of the S-SSB communication may be referred to as a "first repetition" and a second transmission of the S-SSB communication (e.g., a transmission of the same waveform or a different waveform to communicate the same information) may be referred to as a "second repetition." Further, in some contexts, a set of repetitions may include a single repetition. In other words, the Tx UE 120 may transmit a single (i.e., only one) transmission of a communication, which may be referred to as a "repetition" of the communication.

In some aspects, to determine a transmit power configuration, the Tx UE 120 may determine a particular quantity of repetitions of an S-SSB communication to transmit to an Rx UE 120. For example, the Tx UE 120 may determine a maximum transmit power of the Tx UE 120 and may limit a quantity of S-SSB repetitions in different RB sets in accordance with the maximum transmit power (e.g., to avoid power fluctuation issues in reception at the Rx UE 120). In this case, the Tx UE 120 may drop or forgo transmission of one or more repetitions of an S-SSB communication in one or more RB sets to limit a total transmit power across all repetitions of the S-SSB communication. Additionally, or alternatively, the quantity of repetitions of an S-SSB communication may be based on an amount of available transmit power. In other words, the Tx UE 120 may allocate transmit power, of the maximum transmit power, to sets of transmissions according to a prioritization. For example, the Tx UE 120 may allocate transmit power to one or more transmissions on an anchor RB set, which has a higher relative priority (or order of allocation) and may allocate remaining transmit power to one or more transmissions on a non-anchor RB set, which has a lower relative priority (or order of allocation). Accordingly, a quantity of transmissions that occur on the non-anchor RB set may be based on the amount of remaining transmit power. For example, the Tx UE 120 may have a minimum transmit power that is allocated to transmissions and may assign transmit power to only as many transmissions as can be assigned such that each assigned transmission has at least the minimum transmit power without exceeding the amount of remaining transmit power.

Additionally, or alternatively, to determine a transmit power configuration, the Tx UE 120 may adjust a transmit power level of an individual repetition of an S-SSB communication. For example, the Tx UE 120 may reduce a transmit power of an S-SSB repetition (e.g., a legacy 11-RB S-SSB transmission) in an anchor RB set. In this case, based at least in part on unlicensed sidelink spectrum being used for short distance communication (e.g., in an indoor setting), in some cases, reducing the transmit power of the S-SSB repetition can be performed without a negative impact to S-SSB coverage (e.g., without the Rx UE 120 failing to receive the S-SSB repetition in the anchor RB set).

In some aspects, an amount to which the Tx UE 120 reduces the transmit power may be based at least in part on a specification (e.g., a fixed value), a measurement (e.g., of an amount of interference or a signal strength, such as a reference signal received power), or a signaled parameter (e.g., a configuration from another UE 120 or from a network node 110). In these cases, the Tx UE 120 may determine an offset value representing an amount of transmit power backoff from, for example, a maximum transmit power of the Tx UE 120 (or some other transmit power threshold). For example, the Tx UE 120 may cap an anchor RB set transmit power to 16 decibel-milliwatts (dBm) or 13 dBm under a power-spectral density (PSD) limit for a subcarrier spacing of 30 kilohertz (kHz) or 15 kHz.

Additionally, or alternatively, the Tx UE 120 may adjust a transmit power of an S-SSB repetition in a non-anchor RB set. For example, the Tx UE 120 may reduce transmit powers of one or more non-anchor RB set S-SSB repetitions to avoid causing power fluctuation issues at the Rx UE 120. In this case, the non-anchor RB set S-SSB repetitions may be used for wideband COT padding (e.g., to maintain a wideband COT, as described above). Accordingly, the Tx UE 120 may reduce a transmit power of the non-anchor RB set S-SSB repetitions without causing the Rx UE 120 to fail to receive an S-SSB communication (as the Rx UE 120 may only monitor for the S-SSB communication to obtain synchronization information in the anchor RB set). In other words, in connection with the Tx UE 120 allocating transmit power for transmissions in the anchor RB set, the Tx UE 120 may allocate remaining transmit power from the maximum transmit power to transmissions in the non-anchor RB-sets (e.g., by reducing the transmit power of the non-anchor RB set S-SSB repetitions, as described above). In this example, the Tx UE 120 may allocate the remaining transmit power equally among transmissions in the non-anchor RB-sets or using another assignment technique.

In some aspects, the Tx UE 120 may perform a plurality of different adjustments to determine a transmit power configuration. For example, the Tx UE 120 may perform two or more of adjusting a quantity of S-SSB repetitions, adjusting an anchor RB set S-SSB repetition transmit power, or adjusting a non-anchor RB set S-SSB repetition transmit power. In this case, the Tx UE 120 may select which adjustments to perform statically (e.g., the Tx UE 120 may be configured to adjust a quantity of S-SSB repetitions and a non-anchor RB set S-SSB repetition transmit power). Alternatively, the Tx UE 120 may select which adjustments to perform dynamically. For example, the Tx UE 120 may receive feedback information and may switch from performing a single adjustment (e.g., adjusting an anchor RB set S-SSB repetition transmit power) to performing a plurality of adjustments (e.g., adjusting an anchor RB set S-SSB repetition transmit power and a non-anchor RB set S-SSB repetition transmit power). Additionally, or alternatively, the Tx UE 120 may periodically reconfigure an adjustment. For example, the Tx UE 120 may change a size of a transmit power offset applied to reduce an anchor RB set S-SSB repetition transmit power. As another example, the Tx UE 120 may apply a transmit power offset to a first quantity of non-anchor RB set S-SSB repetitions at a first time, receive feedback information, and apply the same or a different transmit power offset to a second quantity of non-anchor RB set S-SSB repetitions at a second time.

As further shown in FIG. 8, and by reference number 830, the Tx UE 120 may transmit a set of S-SSB repetitions. For example, the Tx UE 120 may transmit one or more anchor RB set S-SSB repetitions and/or one or more non-anchor RB set S-SSB repetitions with a configured transmit power in accordance with a transmit power configuration. Additionally, or alternatively, the Tx UE 120 may transmit a particular quantity of S-SSB repetitions in accordance with a transmit power configuration.

As indicated above, FIG. 8 is provided as an example. Other examples may differ from what is described with respect to FIG. 8.

Figure 9:
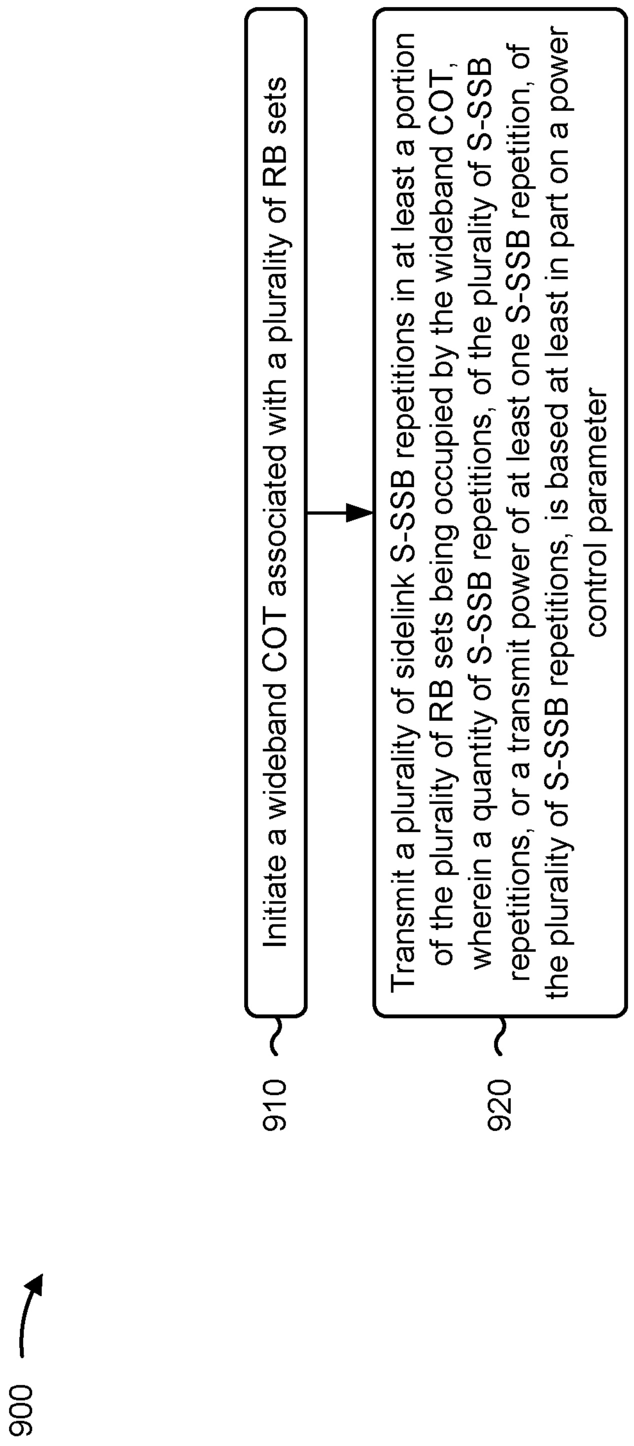
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with power configuration for channel occupancy time signaling.

As shown in FIG. 9, in some aspects, process 900 may include initiating a wideband COT associated with a plurality of resource block (RB) sets (block 910). For example, the UE (e.g., using communication manager 1006, depicted in FIG. 10) may initiate a wideband COT associated with a plurality of resource block (RB) sets, as described above.

As further shown in FIG. 9, in some aspects, process 900 may include transmitting a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter (block 920). For example, the UE (e.g., using transmission component 1004 and/or communication manager 1006, depicted in FIG. 10) may transmit a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter, as described above.

Process 900 may include additional aspects, such as any single aspect or any combination of aspects described below and/or in connection with one or more other processes described elsewhere herein.

In a first aspect, the quantity of S-SSB repetitions is based at least in part on a maximum transmit power of the UE.

In a second aspect, alone or in combination with the first aspect, transmitting the plurality of S-SSB repetitions in the at least the portion of the plurality of RB sets comprises transmitting the plurality of S-SSB repetitions in a quantity of RB sets that is less than a quantity configured RB sets in the plurality of RB sets.

In a third aspect, alone or in combination with one or more of the first and second aspects, the transmit power of at least one S-SSB repetition, of the plurality of S-SSB repetitions, in an anchor RB set of the plurality of RB sets is offset from a maximum transmit power by a threshold amount.

In a fourth aspect, alone or in combination with one or more of the first through third aspects, the transmit power of a subset of at least one S-SSB repetition, of the plurality of S-SSB repetitions, in a non-anchor RB set of the plurality of RB sets is offset from a maximum transmit power by a threshold amount.

In a fifth aspect, alone or in combination with one or more of the first through fourth aspects, the at least one S-SSB repetition in the non-anchor RB set is a wideband COT padding communication.

In a sixth aspect, alone or in combination with one or more of the first through fifth aspects, the offset from the maximum transmit power is associated with an anchor RB set transmit power.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
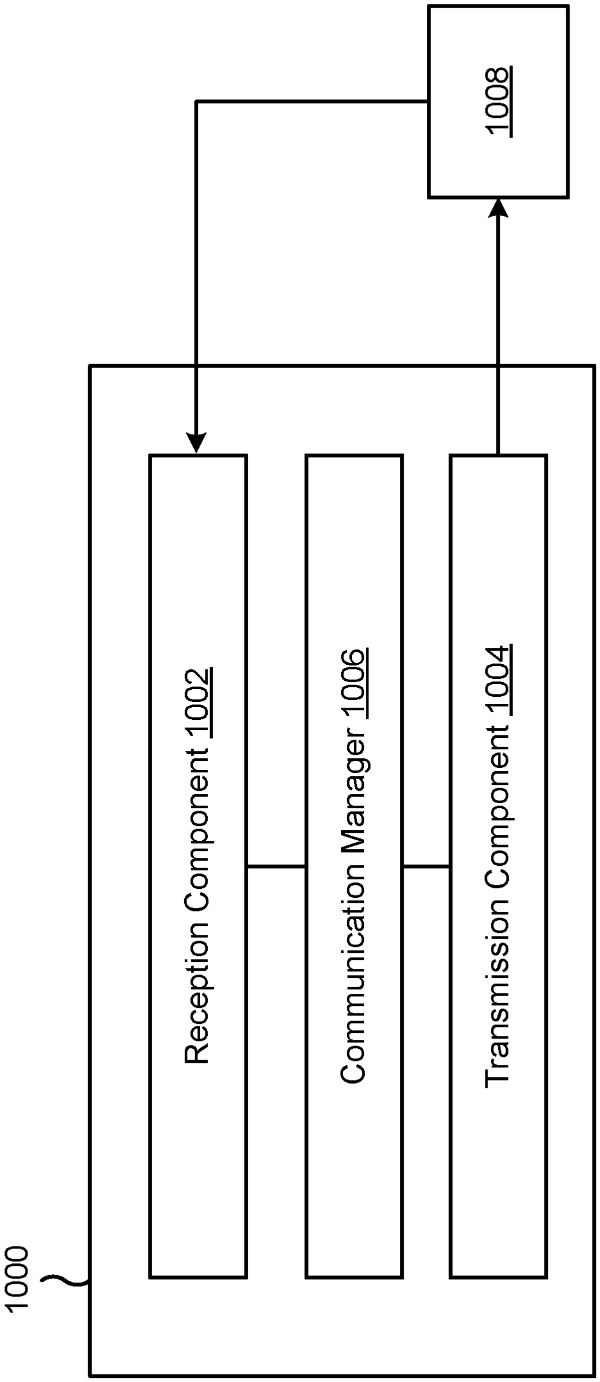
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may initiate a wideband COT associated with a plurality of RB sets. The transmission component 1004 may transmit a plurality of S-SSB repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: initiating a wideband channel occupancy time (COT) associated with a plurality of resource block (RB) sets; and transmitting a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter.

Aspect 2: The method of Aspect 1, wherein the quantity of S-SSB repetitions is based at least in part on a maximum transmit power of the UE.

Aspect 3: The method of any of Aspects 1-2, wherein transmitting the plurality of S-SSB repetitions in the at least the portion of the plurality of RB sets comprises: transmitting the plurality of S-SSB repetitions in a quantity of RB sets that is less than a quantity configured RB sets in the plurality of RB sets.

Aspect 4: The method of any of Aspects 1-3, wherein the transmit power of at least one S-SSB repetition, of the plurality of S-SSB repetitions, in an anchor RB set of the plurality of RB sets is offset from a maximum transmit power by a threshold amount.

Aspect 5: The method of any of Aspects 1-4, wherein the transmit power of a subset of at least one S-SSB repetition, of the plurality of S-SSB repetitions, in a non-anchor RB set of the plurality of RB sets is offset from a maximum transmit power by a threshold amount.

Aspect 6: The method of Aspect 5, wherein the at least one S-SSB repetition in the non-anchor RB set is a wideband COT padding communication.

Aspect 7: The method of Aspect 5, wherein the offset from the maximum transmit power is associated with an anchor RB set transmit power.

Aspect 8: An apparatus for wireless communication at a device, comprising a processor; memory coupled with the processor; and instructions stored in the memory and executable by the processor to cause the apparatus to perform the method of one or more of Aspects 1-7.

Aspect 9: A device for wireless communication, comprising a memory and one or more processors coupled to the memory, the one or more processors configured to perform the method of one or more of Aspects 1-7.

Aspect 10: An apparatus for wireless communication, comprising at least one means for performing the method of one or more of Aspects 1-7.

Aspect 11: A non-transitory computer-readable medium storing code for wireless communication, the code comprising instructions executable by a processor to perform the method of one or more of Aspects 1-7.

Aspect 12: A non-transitory computer-readable medium storing a set of instructions for wireless communication, the set of instructions comprising one or more instructions that, when executed by one or more processors of a device, cause the device to perform the method of one or more of Aspects 1-7.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

initiate a wideband channel occupancy time (COT) associated with a plurality of resource block (RB) sets; and transmit a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter, wherein the transmit power of a subset of at least one S-SSB repetition, of the plurality of S-SSB repetitions, in a non-anchor RB set of the plurality of RB sets is offset from a maximum transmit power of the UE by a threshold amount.

2. The UE of claim 1, wherein the quantity of S-SSB repetitions is based at least in part on the maximum transmit power of the UE.

3. The UE of claim 1, wherein the one or more processors, to transmit the plurality of S-SSB repetitions in the at least the portion of the plurality of RB sets, are configured to:

transmit the plurality of S-SSB repetitions in a quantity of RB sets that is less than a quantity configured RB sets in the plurality of RB sets.

4. The UE of claim 1, wherein the transmit power of at least one S-SSB repetition, of the plurality of S-SSB repetitions, in an anchor RB set of the plurality of RB sets is offset from the maximum transmit power of the UE by a second threshold amount.

5. The UE of claim 1, wherein the at least one S-SSB repetition in the non-anchor RB set is a wideband COT padding communication.

6. The UE of claim 1, wherein the offset from the maximum transmit power of the UE is associated with an anchor RB set transmit power.

7. A method of wireless communication performed by a user equipment (UE), comprising:

initiating a wideband channel occupancy time (COT) associated with a plurality of resource block (RB) sets; and transmitting a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter, wherein the transmit power of a subset of at least one S-SSB repetition, of the plurality of S-SSB repetitions, in a non-anchor RB set of the plurality of RB sets is offset from a maximum transmit power of the UE by a threshold amount.

8. The method of claim 7, wherein the quantity of S-SSB repetitions is based at least in part on the maximum transmit power of the UE.

9. The method of claim 7, wherein transmitting the plurality of S-SSB repetitions in the at least the portion of the plurality of RB sets comprises:

transmitting the plurality of S-SSB repetitions in a quantity of RB sets that is less than a quantity configured RB sets in the plurality of RB sets.

10. The method of claim 7, wherein the transmit power of at least one S-SSB repetition, of the plurality of S-SSB repetitions, in an anchor RB set of the plurality of RB sets is offset from the maximum transmit power of the UE by a second threshold amount.

11. The method of claim 7, wherein the at least one S-SSB repetition in the non-anchor RB set is a wideband COT padding communication.

12. The method of claim 7, wherein the offset from the maximum transmit power is associated with an anchor RB set transmit power.

13. A non-transitory computer-readable medium storing a set of instructions for wireless communication, the set of instructions comprising:

one or more instructions that, when executed by one or more processors of a user equipment (UE), cause the UE to:

initiate a wideband channel occupancy time (COT) associated with a plurality of resource block (RB) sets; and transmit a plurality of sidelink synchronization signal block (S-SSB) repetitions in at least a portion of the plurality of RB sets being occupied by the wideband COT, wherein a quantity of S-SSB repetitions, of the plurality of S-SSB repetitions, or a transmit power of at least one S-SSB repetition, of the plurality of S-SSB repetitions, is based at least in part on a power control parameter, wherein the transmit power of a subset of at least one S-SSB repetition, of the plurality of S-SSB repetitions, in a non-anchor RB set of the plurality of RB sets is offset from a maximum transmit power of the UE by a threshold amount.

14. The non-transitory computer-readable medium of claim 13, wherein the quantity of S-SSB repetitions is based at least in part on the maximum transmit power of the UE.

15. The non-transitory computer-readable medium of claim 13, wherein the one or more instructions, that cause the UE to transmit the plurality of S-SSB repetitions in the at least the portion of the plurality of RB sets, cause the UE to:

transmit the plurality of S-SSB repetitions in a quantity of RB sets that is less than a quantity configured RB sets in the plurality of RB sets.

16. The non-transitory computer-readable medium of claim 13, wherein the transmit power of at least one S-SSB repetition, of the plurality of S-SSB repetitions, in an anchor RB set of the plurality of RB sets is offset from the maximum transmit power of the UE by a second threshold amount.

17. The non-transitory computer-readable medium of claim 13, wherein the at least one S-SSB repetition in the non-anchor RB set is a wideband COT padding communication.

* * * * *